I. N. KNAPP.
PROCESS OF TREATING NATURAL GAS.
APPLICATION FILED OCT. 5, 1911.

1,023,783.

Patented Apr. 16, 1912.
2 SHEETS—SHEET 2.

WITNESSES:

INVENTOR
Isaac N. Knapp
BY
Augustus B. Stoughton
ATTORNEY

UNITED STATES PATENT OFFICE.

ISAAC N. KNAPP, OF ARDMORE, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

PROCESS OF TREATING NATURAL GAS.

1,023,783. Specification of Letters Patent. Patented Apr. 16, 1912.

Application filed October 5, 1911. Serial No. 652,945.

*To all whom it may concern:*

Be it known that I, ISAAC N. KNAPP, a citizen of the United States, residing at Ardmore, in the county of Montgomery and State of Pennsylvania, have invented a certain new and useful Process of Treating Natural Gas, of which the following is a specification.

The principal object of the present invention is to make acetylene out of natural gas.

In the practice of the invention natural gas which contains approximately 92% to 97% of methane or marsh gas $CH_4$ is passed through a bed of coke or coal from which air is excluded and which is maintained at a heat higher than that of ordinary or atmospheric combustion, with the result that changes occur in the gas in respect to the carbon contained therein by reason of the fact that the marsh gas is converted into acetylene $C_2H_2$. The reaction is represented by the chemical equation $$CH_4 + 3C = 2C_2H_2.$$

Thus for each thousand cubic feet of marsh gas treated there should be theoretically obtained two thousand feet of acetylene.

The process may be practised by means of the apparatus illustrated in the accompanying drawings, in which—

Figure 1:
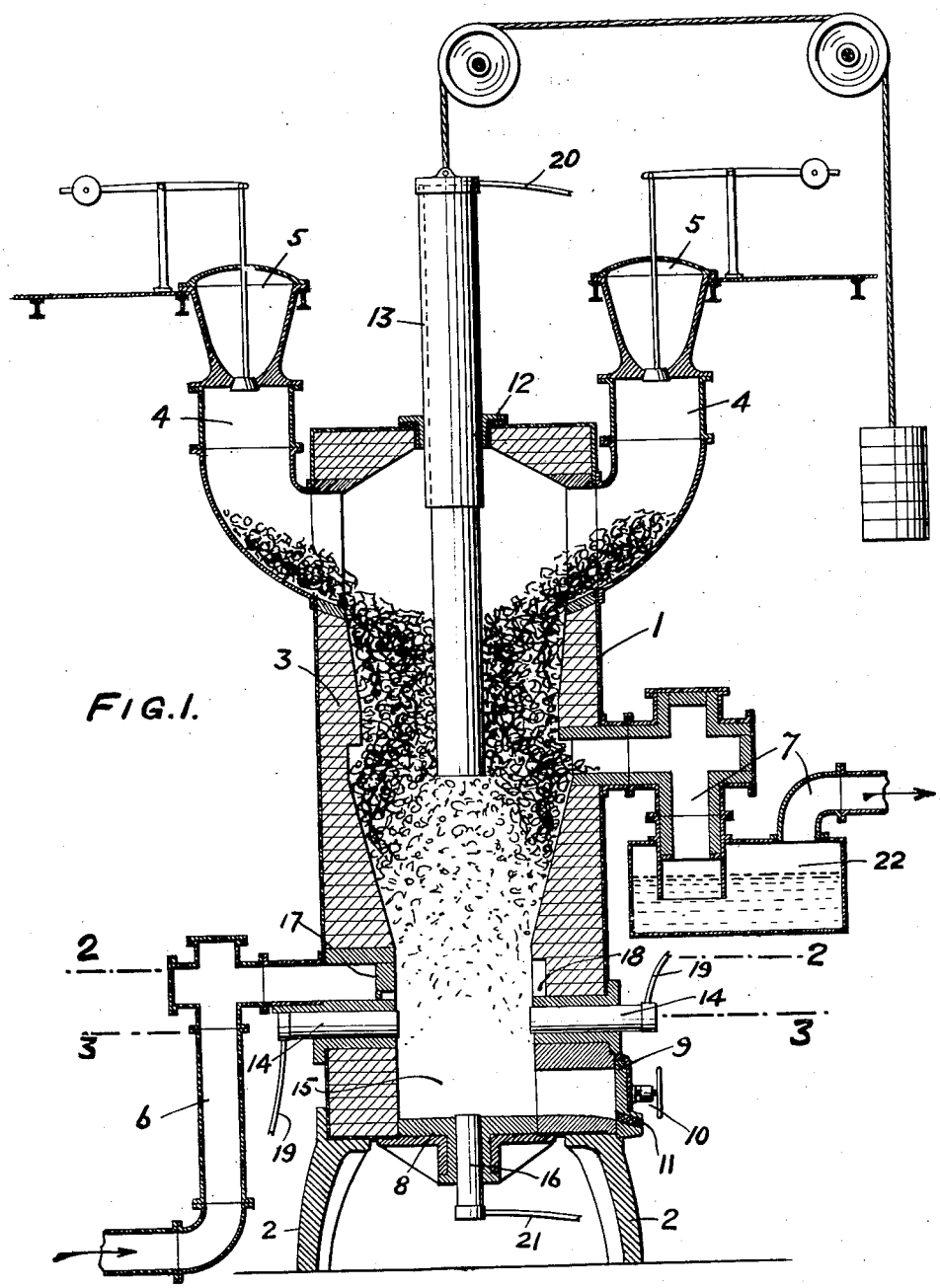
Figure 2:
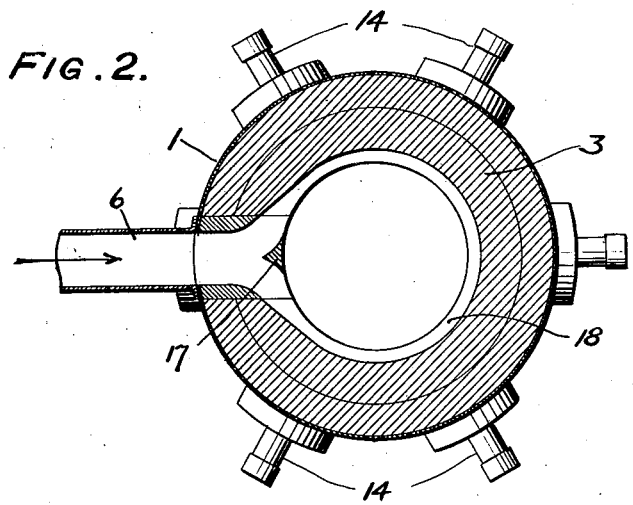
Figure 3:
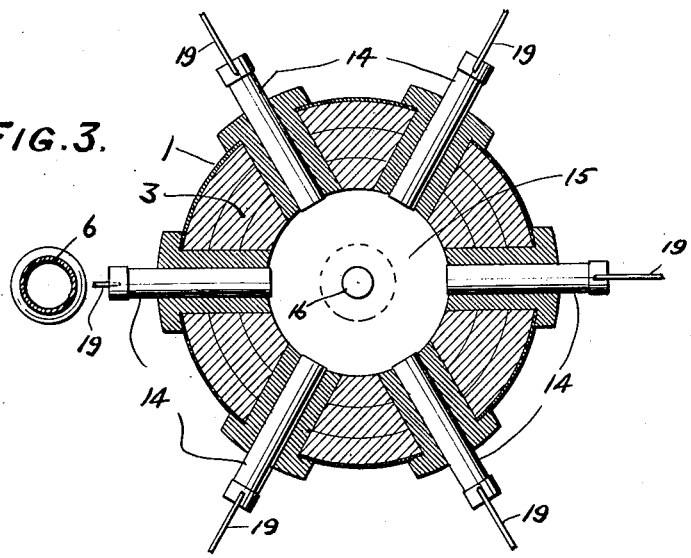

Figure 1, is a view principally in vertical section showing a charged furnace adapted for use in the practice of the process of my invention, and Fig. 2, is a horizontal section on the line 2—2 of Fig. 1, and Fig. 3, is a similar view on the line 3—3 of Fig. 1, but in Figs. 2 and 3, the charge is not indicated.

The furnace shown consists of a vertical cylindrical boiler plate shell 1, supported on legs 2, and lined with refractory brick 3, preferably such as are non-conducting electrically when exposed to heat. Suitable openings in the shell and lining are provided at which are attached the following: charging branches 4, on which are indicated charging devices 5; the gas inlet 6 and gas outlet 7; the bottom 8, designed to be removed when necessary for repairing or cleaning the furnace; and the cleaning door 9 secured by the cotter bar and screw 10. A tap hole 11 is shown for removal of fused ash or slag. 12, is an insulating pack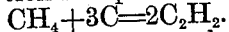ing box in the top head for the adjustable carbon electrode 13, which may be moved up or down by hand or mechanically, to meet the working conditions of the furnace. 14, are fixed graphite or suitable electrodes bedded in the masonry and insulated and made gas-tight through the shell below the gas inlet 6 and above the hearth 15. 16, is a fixed electrode in the bottom 8. A deflector in the gas inlet pipe 6 is shown at 17, and an annular space 18 is formed by setting the lining brick back to give a free entrance of the inflowing gases to the carbon bed. 19 are the several electric cable connections of one polarity, and 20 one cable connection of opposite polarity. 21 is a connection to electrode 16 which may be used in conjunction with electrodes 14, or with 13, as the conditions of working may require. 22 is a water seal similar to those in common use, to prevent back flow of gases.

The furnace is charged with coke or other carbonaceous material to a point somewhat above the gas inlet 6. With this charge may be mixed a fluxing material depending on the nature of the ash. The adjustable electrode 13 is lowered to contact with the charge, the electric current is switched on, more charge is added and the carbon electrode and electric current adjusted to a proper working condition for heating the bed of carbon to a temperature higher than that of ordinary or atmospheric combustion. The limit of ordinary or atmospheric combustion as attained in commercial practice is about 1800° centigrade and with regeneration about 2000° centigrade. By electric heating a temperature of from 2500° centigrade to 3500° centigrade can be obtained and maintained and such a temperature is necessary for bringing about the direct addition of carbon to natural gas in accordance with my invention. The natural gas is then admitted under sufficient pressure to pass through the bed of highly heated carbonaceous material at a rate for its proper treatment and the resulting acetylene led off for use or subsequent treatment. The natural gas so introduced may be pre-heated.

In speaking of the formation of acetylene it is not intended to exclude the formation of like gas, such as ethylene, nor is the use of gases containing hydro-carbons in the nature of methane or marsh gas excluded.

What I claim is:

The process of treating natural gas which consists in passing it through an incandescent bed of carbon from which air is excluded and maintaining the temperature of the bed above that of the ordinary or atmospheric combustion thereof, whereby the methane or marsh gas of the natural gas takes on carbon and is converted into acetylene.

In testimony whereof I have hereunto signed my name.

ISAAC N. KNAPP.

Witnesses:
 CLIFFORD K. CASSEL,
 FRANK E. FRENCH.